(12) United States Patent
Linhardt

(10) Patent No.: US 8,572,742 B1
(45) Date of Patent: Oct. 29, 2013

(54) DETECTING AND REPAIRING MASTER BOOT RECORD INFECTIONS

(75) Inventor: Peter Linhardt, Malibu, CA (US)

(73) Assignee: Symantec Corporation, Mountain View, CA (US)

( * ) Notice: Subject to any disclaimer, the term of this patent is extended or adjusted under 35 U.S.C. 154(b) by 185 days.

(21) Appl. No.: 13/049,662

(22) Filed: Mar. 16, 2011

(51) Int. Cl.
  *G06F 21/02* (2006.01)
  *G06F 15/177* (2006.01)

(52) U.S. Cl.
  USPC .............................................. 726/24; 713/2

(58) Field of Classification Search
  None
  See application file for complete search history.

(56) References Cited

U.S. PATENT DOCUMENTS

| | | | | |
|---|---|---|---|---|
| 5,483,649 | A * | 1/1996 | Kuznetsov et al. | 726/22 |
| 5,509,120 | A * | 4/1996 | Merkin et al. | 726/24 |
| 6,792,556 | B1 * | 9/2004 | Dennis | 714/6.11 |
| 6,802,028 | B1 * | 10/2004 | Ruff et al. | 714/38.13 |
| 6,862,681 | B2 * | 3/2005 | Cheston et al. | 713/2 |
| 6,931,522 | B1 * | 8/2005 | Raghavan et al. | 713/2 |
| 6,934,722 | B1 * | 8/2005 | Goshey et al. | 1/1 |
| 6,963,951 | B2 * | 11/2005 | Ng et al. | 711/112 |
| 7,424,398 | B2 * | 9/2008 | Booth et al. | 702/186 |
| 7,447,888 | B2 * | 11/2008 | Du et al. | 713/1 |
| 7,565,523 | B2 * | 7/2009 | Han | 713/2 |
| 7,757,112 | B2 * | 7/2010 | Childs et al. | 714/5.1 |
| 7,877,809 | B1 * | 1/2011 | Sutton et al. | 726/24 |
| 7,921,461 | B1 * | 4/2011 | Golchikov et al. | 726/23 |
| 8,037,291 | B2 * | 10/2011 | Peacock | 713/2 |
| 8,234,710 | B2 * | 7/2012 | Wenzinger et al. | 726/24 |
| 8,266,692 | B2 * | 9/2012 | Wenzinger et al. | 726/22 |
| 2002/0166059 | A1 * | 11/2002 | Rickey et al. | 713/200 |
| 2004/0153840 | A1 * | 8/2004 | Buchanan et al. | 714/42 |
| 2004/0255106 | A1 * | 12/2004 | Rothman et al. | 713/1 |
| 2007/0050611 | A1 * | 3/2007 | Weikel | 713/2 |
| 2007/0074290 | A1 * | 3/2007 | Kobayashi et al. | 726/24 |
| 2007/0226478 | A1 * | 9/2007 | Rudelic | 713/1 |
| 2008/0005797 | A1 * | 1/2008 | Field et al. | 726/24 |
| 2008/0209553 | A1 * | 8/2008 | Lu et al. | 726/22 |
| 2008/0301424 | A1 * | 12/2008 | Barajas et al. | 713/2 |
| 2009/0013167 | A1 * | 1/2009 | Wang | 713/2 |
| 2009/0133124 | A1 * | 5/2009 | Bai | 726/24 |
| 2009/0300415 | A1 * | 12/2009 | Zhang et al. | 714/19 |
| 2011/0138163 | A1 * | 6/2011 | Suginaka | 713/2 |
| 2012/0255017 | A1 * | 10/2012 | Sallam | 726/24 |

OTHER PUBLICATIONS

"Booting," Wikipedia, Last Modified Aug. 17, 2011, 6 pages, [Online] [Retrieved on Aug. 17, 2011] Retrieved from the Internet<URL:http://en.wikipedia.org/wiki/Booting#Boot_loader>.

Tyson, J., "How PCs Work," HowStuffWorks, Inc., 1998-2011, 19 pages, [Online] [Retrieved on Aug. 17, 2011] Retrieved from the Internet<URL:http://www.howstuffworks.com/pc3.htm>.

* cited by examiner

*Primary Examiner* — Christopher Revak
(74) *Attorney, Agent, or Firm* — Fenwick & West LLP

(57) ABSTRACT

Security is provided for a client by replacing a volume boot module adapted to execute during a boot process of the client with a repair module. The client is booted to start the boot process and to execute a master boot module. The repair module is executed in place of the volume boot module. The repair module determines whether the master boot module is infected with malware. If the master boot module is infected, the repair module repairs the malware infection by disabling and/or removing the malware.

20 Claims, 4 Drawing Sheets

DETECTING AND REPAIRING MASTER BOOT RECORD INFECTIONS

BACKGROUND

1. Field of the Embodiments

The embodiments disclosed herein pertain in general to computer security and in particular to detecting and removing malware that infects a system during the boot process.

2. Description of the Related Art

When a computer is turned on, a boot process is initiated in order to load the computer's operating system. Typically, the first code run as part of the boot process is the basic input/output system (BIOS). The BIOS identifies a bootable device, such as a hard drive, and passes control of the computer to code stored at a specific location on the bootable device. The location of the code on the bootable device is often referred to as the master boot record (MBR). The code stored at the MBR loads one or more modules that load and start the operating system of the computer.

A type of malware, often referred to as a "MBR rootkit" or the "Mebroot Trojan," infects the MBR and as a result executes during the boot process. This early execution allows the malware to bypass security measures and infect the operating system as it is being loaded. The malware infects the operating system in a way that allows it to hide its presence. One way that the malware hides and protects itself is by modifying read and write requests. For example, if a legitimate program executed by the operating system attempts to read the MBR or other location on a storage device where the malware is stored, the malware causes the operating system to return to the program an image of what the storage device would look like without the malware. Likewise, the malware prevents any writes to the MBR or other locations on the storage device that would affect the malware. Therefore, it is very difficult to detect and remove this type of malware.

One way of detecting and removing the malware is by loading a second operating system from a trusted boot device. For example, the second operating system may be loaded from a CD-ROM or a USB flash drive. However, this technique requires additional hardware (e.g., the flash drive) and the process may be too complex for a typical user.

BRIEF SUMMARY OF THE INVENTION

The above and other needs are met by a computer-implemented method, a computer program product, and a computer system providing security. Embodiments of the method comprise replacing a volume boot module adapted to execute during a boot process of the client with a repair module. The client is booted to start the boot process and to execute a master boot module. The repair module is executed in place of the volume boot module. The repair module determines whether the master boot module is infected with malware. If the master boot module is infected, the repair module repairs the malware infection by disabling and/or removing the malware.

Embodiments of the computer program product have a computer-readable storage medium having computer-executable instructions. The computer-executable instructions comprise a replacement module that is adapted to replace a volume boot module adapted to execute during a boot process of the client with a repair module. The replacement module is further adapted to configure the client to boot and start the boot process. The repair module is executed in place of the volume boot module. The repair module is adapted to determine during the boot process whether the master boot module is infected with malware. If it is determined that the master boot module is infected, the repair module is adapted to repair the malware infection by disabling and/or removing the malware.

Embodiments of the computer system comprise a computer processor and a computer-readable storage medium storing computer program modules adapted to execute on the computer processor. The computer program modules comprise a replacement module that is adapted to replace a volume boot module adapted to execute during a boot process of the system with a repair module. The replacement module is further adapted to configure the system to boot and start the boot process. The repair module is executed in place of the volume boot module. The repair module is adapted to determine during the boot process whether the master boot module is infected with malware. If it is determined that the master boot module is infected, the repair module is adapted to repair the malware infection by disabling and/or removing the malware.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
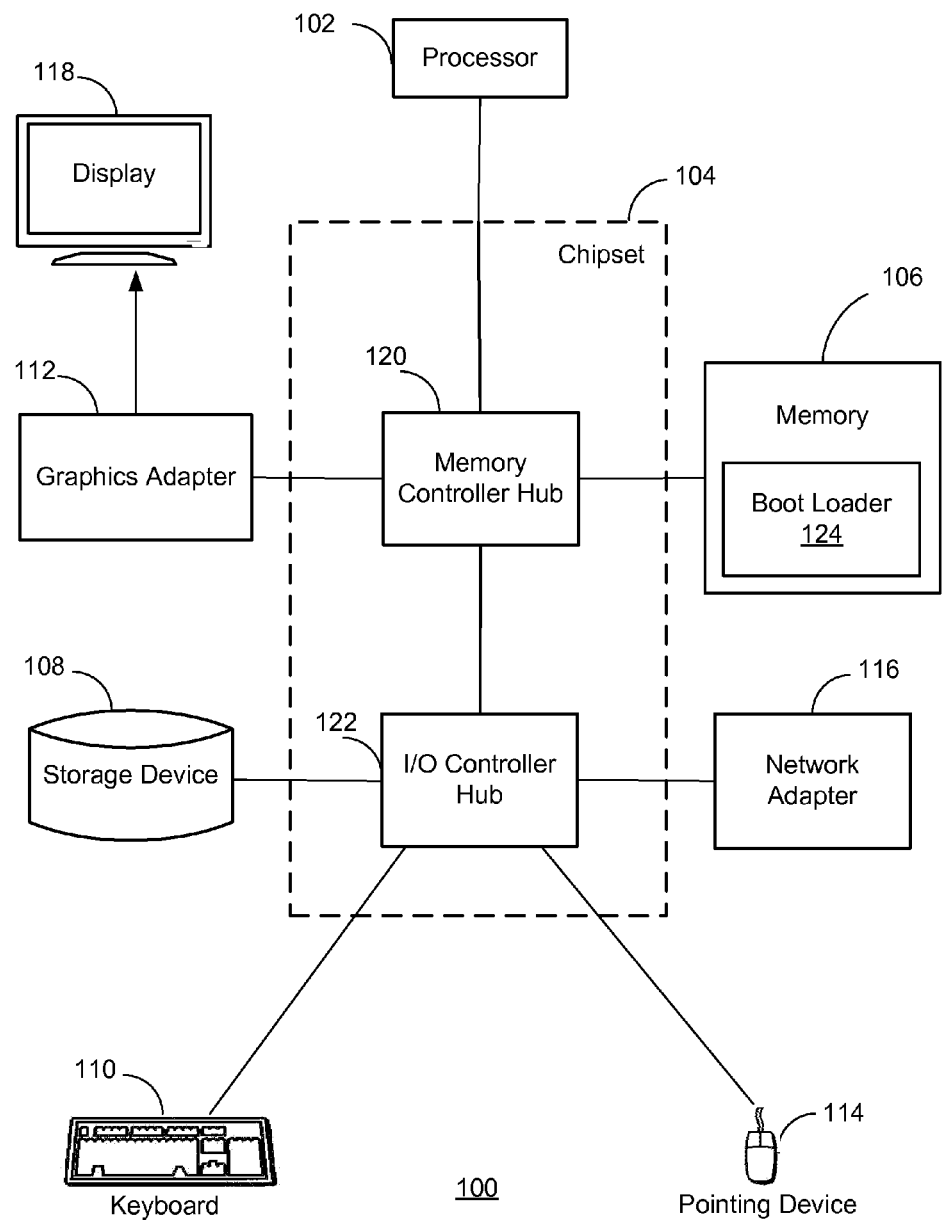
FIG. 1 is a high-level block diagram illustrating the architecture of a client according to one embodiment.

FIG. 1 is a high-level block diagram illustrating the architecture of a client 100 according to one embodiment. In one embodiment, the client 100 is a computer used by a user for various functions. For example, the client 100 may be used by a user to surf the web, prepare a document, view and edit pictures, and to listen to music.

The client 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display device 118 is coupled to the graphics adapter 112. A storage device 108, keyboard 110, pointing device 114, and network adapter 116 are coupled to the I/O controller hub 122. Other embodiments of the client 100 have different configurations. For example, in some embodiment the memory 106 is directly coupled to the processor 102.

The processor 102 executes computer program instructions. In one embodiment, the processor 102 operates in real mode and protected mode. In real mode, executed instructions are allowed direct access to the client's resources which include the memory 106, the storage device 108, and the other devices of the client 100. In protected mode, access to the client's resources and execution of privileged instructions is restricted based on privilege levels enforced by the processor 102 and/or operating system. Typically, the processor 102 operates in real mode from the time the client 100 is booted until the time the operating system of the client 100 is started. Once the operating system is started, the processor 102 operates in protected mode.

The memory 106 holds instructions and data used by the processor 102. The memory 106 includes a boot loader 124 that initiates a boot process. The boot process is a process of loading and starting the client's operating system when the client 100 is turned on or reset. In one embodiment, the boot loader 124 is the basic input/output system (BIOS) of the client 100. In another embodiment, the boot loader 124 is the Extensible Firmware Interface (EFI) of the client 100.

When the client 100 is booted, the boot loader 124 identifies and initializes devices of the client 100, such as the storage device 108, the keyboard 110, the pointing device 114, and the network adapter 116. The boot loader 124 operates in real mode which allows it to freely access the client's devices. Assume for this discussion that the boot loader 124 identifies the storage device 108 as a device that includes one or more boot modules. In other words, the boot loader 124 identifies the storage device 108 as a bootable device. The boot loader 124 transfers control of the client 100 to the boot modules by loading at least one of the boot modules so that it can be executed by the processor 102.

The boot loader 124 includes a library of functions. While the client 100 is in real mode, the functions may be called by a module executing on the client 100 to operate and control the client's devices. For example, the functions may be used by a module while in real mode to read and write to the storage device 108.

The storage device 108 is a non-transitory computer-readable storage medium such as a hard drive, compact disk read-only memory (CD-ROM), DVD, or a solid-state memory device. As described above, the storage device 108 includes boot modules. Boot modules are modules executed during the boot process to load and start the client's operating system. In one embodiment, the boot modules in the storage device 108 include a master boot module and one or more volume boot modules. The boot modules are described in detail below.

The pointing device 114 is a mouse, track ball, or other type of pointing device, and is used in combination with the keyboard 110 to input data to the client 100. The graphics adapter 112 displays images and other information on the display device 118. The network adapter 116 couples the client 100 to a network. The network enables communication among entities connected to it. In one embodiment, the network is the Internet and uses standard communications technologies and/or protocols.

Some embodiments of the client 100 have different and/or other devices than those shown in FIG. 1 depending on functionality of the client 100. For example, if the client 100 is a personal computer, the computer will typically include the same devices as those shown in FIG. 1. However, if the client 100 is a mobile telephone, the phone will typically have limited processing power, a small display, and may lack a pointing device 114.

The client 100 is adapted to execute computer program modules for providing functionality described herein. As used herein, the term "module" refers to computer program instructions and other logic used to provide the specified functionality. Thus, a module can be implemented in hardware, firmware, and/or software. In one embodiment, modules stored on the storage device 108 are formed of executable computer program instructions, loaded into the memory 106, and executed by the processor 102.

Figure 2:
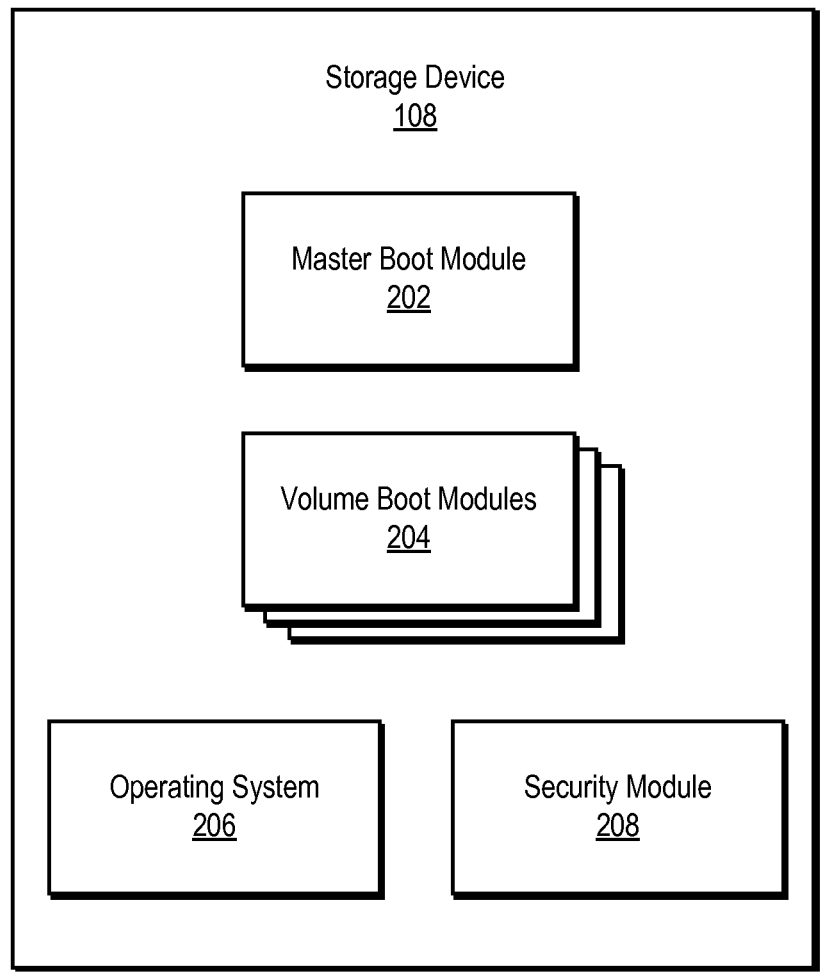
FIG. 2 is a high-level block diagram illustrating a detailed view of a storage device according to one embodiment.

FIG. 2 is a high-level block diagram illustrating a detailed view of the storage device 108 according to one embodiment. The storage device 108 includes a master boot module 202, one or more volume boot modules 204, an operating system 206, and a security module 208. Those of skill in the art will recognize that other embodiments of the storage device 108 can have different and/or other modules than the ones described here, and that the functionalities can be distributed among the modules in a different manner.

The master boot module 202 is a boot module executed as part of the process of loading and starting the operating system 206 (i.e., the boot process). In one embodiment, the master boot module 202 is the first boot module, of those stored on the storage device 108, that is loaded and executed by the boot loader 124 as part of the boot process. In one embodiment, master boot module 202 is stored in the first area of the storage device 108 as the master boot record (MBR). The master boot module 202 identifies the location of the next boot module to be executed as part of the boot process and loads the boot module in the identified location. In one embodiment, the boot module loaded by the master boot module 202 is one of the volume boot modules 204.

The volume boot modules 204 are boot modules stored on the storage device 108 that are loaded and executed after the master boot module 202. One or more of the volume boot modules 204 can execute as part of the boot process. The final volume boot module 204 in the boot process loads the operating system 206. In one embodiment, the volume boot modules 204 include a boot module stored in a volume boot record location of the storage device 108 and an operating system loader. In this embodiment, the boot process is as follows: the boot loader 124 loads the master boot module 202, the master boot module 202 loads the volume boot record module, the volume boot record module loads the operating system loader, and the operating system loader loads the operating system 206.

The operating system 206 manages the hardware and software resources of the client 100. The operating system 206 provides a user interface that allows a user to interact with the client 100. The operating system 206 also controls low-level processes, such as how memory 106 is read and written, the order in which processes are executed, and how information is received and sent by the client's devices. The operating system 206 may be any type of operating system such as a variant of MICROSOFT WINDOWS, MAC OS X, LINUX, or UNIX.

The security module 208 modifies the boot process of the client 100 in order to detect and clean malware that infects the master boot module 202 or otherwise subverts the boot process. Since this type of malware infects the master boot module 202, it runs in real mode and infects the client 100 before the operating system 206 is started. Once the client 100 is in protected mode (i.e., once the operating system 206 has been started), programs executed by the operating system 206 cannot detect or modify the malware because the malware modifies the operating system 206 to deflect any protected mode operations that would directly reveal the presence of the malware.

To determine whether the master boot module 202 is infected with malware, the security module 208 replaces a volume boot module 204 with a repair module while the client 100 is in protected mode. As used herein, "replacing a module" can involve overwriting the entire module, overwriting a portion of the module, and/or inserting another module as part of the replaced module. After the volume boot module 204 has been replaced, the security module 208 reboots the client 100, which causes the client to go through the boot process.

During the boot process, the repair module is executed in real mode at the point when the replaced volume boot module 204 would normally execute. As a result, the repair module can directly access the master boot module 202. In one embodiment, the repair module uses the library functions of the boot loader 124 to access the master boot module 202 and other data in the storage device 108.

The repair module determines whether the master boot module 202 is infected with malware. If the master boot module 202 is infected, the repair module repairs the master boot module 202 by removing or disabling the malware. The repair module restores the original volume boot record 204 that was replaced and reboots the client 100. The client 100 now goes through the normal boot process from the beginning without executing the malware that was previously in the master boot module 202.

Figure 3:
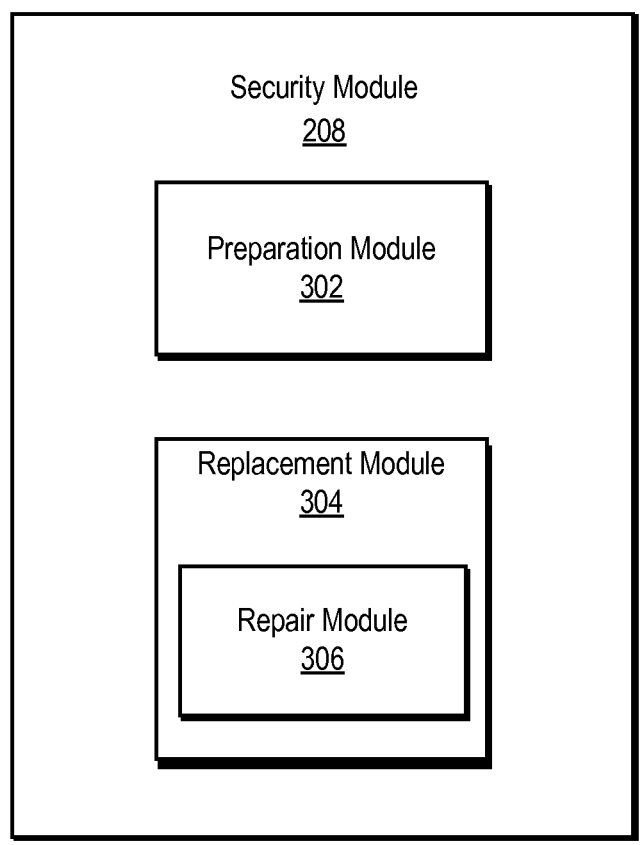
FIG. 3 is a high-level block diagram illustrating a detailed view of a security module according to one embodiment.

FIG. 3 is a high-level block diagram illustrating a detailed view of the security module 208 according to one embodiment. The security module 208 includes a preparation module 302 and a replacement module 304. In one embodiment, the preparation module 302 and replacement module 304 are executed while the client 100 is in protected mode. For example, the preparation module and 302 and the replacement module 304 may be executed by a security program which is executed by a user using the client 100 in protected mode. In one embodiment, the preparation module 302 and the replacement module 304 are executed when an event is detected, such as: receiving a request from a user of the client 100 to check the client 100 for malware, detecting behavior typical of malware that has infected the master boot module 202, and detecting any type of malware during protected mode execution. In one embodiment, the preparation module 302 and the replacement module 304 are executed periodically (e.g., once a week).

The preparation module 302 creates and stores an uninfected copy of the master boot module 202. In one embodiment, the preparation module 302 creates the uninfected copy of the master boot module by using the client's operating system 206 to read the master boot module 202 stored on the storage device 108. Even if the master boot module 202 is infected, the copy of the master boot module read by the preparation module 302 will be not be infected because the malware causes the operating system 206 to return to the preparation module 302 a copy of the master boot module 202 that has no traces of the malware. In other words, the malware hides its presence. In another embodiment, the preparation module 302 creates the uninfected copy by retrieving it from a security server or another entity that communicates with the client 100 via a network, or by reading it from a storage device 108 of the client 100. The preparation module 302 records the storage location of the uninfected copy of the master boot module so that it can be retrieved later. The preparation module 302 additionally creates and stores a copy of a volume boot module 204 that is executed during the boot process.

The replacement module 304 replaces the copied volume boot module 204 with a repair module 306. This replacing causes the repair module 306 to execute during the boot process instead of the replaced volume boot module 204. After replacing the volume boot module 204, the replacement module 304 reboots the client 100.

The repair module 306 is executed at the point in the boot process when the replaced volume boot module 204 would normally execute. When executed, the repair module 306 determines whether the master boot module 202 is infected with malware. This determination can involve, for example, comparing the uninfected copy of the master boot module created by the preparation module 302 with the current master boot module 202 to determine whether the two versions of the master boot module are different. The repair module 306 can conclude that the master boot module 202 is infected with malware if the two versions of the master boot module are not identical. Similarly, the repair module 306 can conclude that the master boot module 202 is infected with malware if the two versions have specific data that are different. The repair module 306 can also conclude that the master boot module 202 is infected by examining the master boot module for malware signatures or other evidence of infection.

If the master boot module 202 is infected with malware, the repair module 306 repairs the infection by removing or otherwise disabling the malware. In one embodiment, the repair module 306 removes the malware by replacing the master boot module 202 with the uninfected copy of the master boot module. The repair module 306 also restores the volume boot module 204 that was replaced and reboots the client 100. In one embodiment, the repair module 306 restores the volume boot module 204 by retrieving the copy of the volume boot module created by the preparation module 302 and replacing itself with the copy of the volume boot module. Since the repair module 306 replaced itself with the copy of the volume boot module, the client 100 will boot in a normal manner at the next boot.

Figure 4:
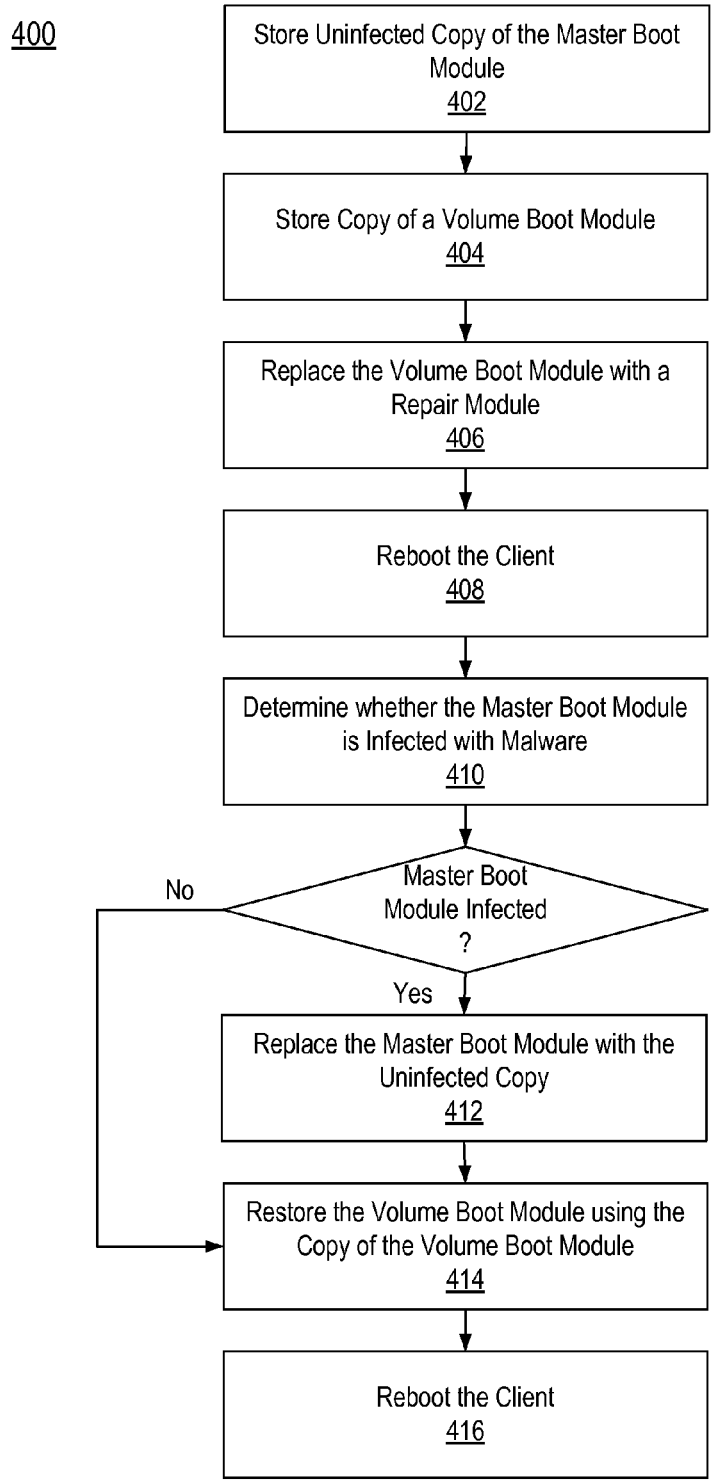
FIG. 4 is a flowchart illustrating steps performed by a security module and a repair module in determining whether a master boot module is infected and, if it is infected, repairing the master boot module according to one embodiment.

FIG. 4 is a flowchart illustrating steps performed by the security module 208 and the repair module 306 in determining whether the master boot module 202 of the client 100 is infected and, if it is infected, repairing the master boot module 202 according to one embodiment. Other embodiments perform the illustrated steps in different orders, and/or perform different or additional steps. Additionally, in other embodiments, some or all of the steps may be performed by different modules.

The security module 208 executes in protected mode and stores 402 an uninfected copy of the master boot module 202 and a copy 404 of a volume boot module on the storage device 108. The security module 208 replaces 406 the copied volume boot module 204 with the repair module 306. The security module 208 reboots 408 the client 100.

The repair module 306 executes in real mode during the boot process. The repair module 306 determines 410 whether the master boot module 202 is infected with malware by, e.g., comparing the uninfected copy of the master boot module with the current master boot module 202. In one embodiment, if the master boot module 202 is different than the uninfected copy, the repair module 306 determines that the master boot module 202 is infected. If it is determined that the master boot module 202 is not infected, the repair module 306 restores 414 the volume boot module 204 using the copy of the volume boot module and reboots 416 the client 100. If it is determined that the master boot module 202 is infected with malware, prior to restoring the volume boot module 204 and rebooting the client 100, the repair module 306 replaces 412 the master boot module 202 with the uninfected copy of the master boot module.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

What is claimed:

1. A computer-implemented method for providing security to a client, the method comprising:
   replacing a volume boot module adapted to execute after a master boot module during a boot process of the client with a repair module;
   booting the client to start the boot process, the boot process executing the master boot module and the repair module;
   determining, by the repair module during the boot process, whether the master boot module is infected with malware; and
   responsive to determining that the master boot module is infected with malware, repairing the malware infection.

2. The method of claim 1, wherein the volume boot module is replaced with the repair module while the client is executing in a protected mode where access to resources of the client is restricted.

3. The method of claim 1, wherein replacing the volume boot module comprises overwriting at least a portion of the volume boot module with the repair module.

4. The method of claim 1, further comprising:
   creating and storing at the client an uninfected copy of the master boot module while the client is executing in a protected mode where access to resources of the client is restricted.

5. The method of claim 4, wherein determining whether the master boot module is infected with malware comprises determining whether the master boot module executed during the boot process is different than the stored uninfected copy of the master boot module.

6. The method of claim 1, wherein repairing the malware infection comprises:
   replacing the master boot module with an uninfected copy of the master boot module.

7. The method of claim 1, further comprising:
   creating and storing a copy of the replaced volume boot module; and
   restoring the volume boot module using the copy of the volume boot module responsive to repairing the malware infection.

8. A computer program product having a non-transitory computer-readable storage medium having computer-executable instructions for providing security to a client, the computer program product comprising:
   a replacement module adapted to:
      replace a volume boot module adapted to execute after a master boot module during a boot process of the client with a repair module; and
      configure the client to boot and start the boot process, wherein the boot process executes the master boot module and the repair module; and
   wherein the repair module is adapted to:
      determine during the boot process whether the master boot module is infected with malware; and
      repair the malware infection responsive to determining that the master boot module is infected with malware.

9. The computer program product of claim 8, wherein the replacement module is adapted to replace the volume boot module with the repair module while the client is executing in a protected mode where access to resources of the client is restricted.

10. The computer program product of claim 8, wherein the replacement module is further adapted to overwrite at least a portion of the volume boot module with the repair module.

11. The computer program product of claim 8, further comprising:
   a preparation module adapted to create and store at the client an uninfected copy of the master boot module while the client is executing in a protected mode where access to resources of the client is restricted.

12. The computer program product of claim 11, wherein the repair module is further adapted to determine whether the master boot module is infected with malware based on whether the master boot module executed during the boot process is different than the stored uninfected copy of the master boot module.

13. The computer program product of claim 8, wherein the repair module is further adapted to replace the master boot module with an uninfected copy of the master boot module responsive to the master boot module being infected with malware.

14. The computer program product of claim 8, wherein the repair module is further adapted to:
   create and store a copy of the replaced volume boot module; and
   restore the volume boot module using the copy of the volume boot module responsive to repairing the malware infection.

15. A computer system providing security, the system comprising:
   a computer processor; and
   a computer-readable storage medium storing computer program modules adapted to execute on the computer processor, the computer program modules comprising:
      a replacement module adapted to:
         replace a volume boot module adapted to execute during a boot process of the client after a master boot module during a boot process of the client with a repair module; and
         configure the system to boot and start the boot process, wherein the boot process executes the master boot module and the repair module; and
      wherein the repair module is adapted to:
         determine during the boot process whether the master boot module is infected with malware; and
         repair the malware infection responsive to determining that the master boot module is infected with malware.

16. The system of claim 15, wherein the replacement module is adapted to replace the volume boot module with the repair module while the system is executing in a protected mode where access to resources of the system is restricted.

17. The system of claim 15, wherein the replacement module is further adapted to overwrite at least a portion of the volume boot module with the repair module.

18. The system of claim 15, further comprising:
   a preparation module adapted to create and store at the system an uninfected copy of the master boot module while the system is executing in a protected mode where access to resources of the system is restricted.

19. The system of claim 18, wherein the repair module is further adapted to determine whether the master boot module is infected with malware based on whether the master boot module is different than the stored uninfected copy of the master boot module.

20. The system of claim 15, wherein the repair module is further adapted to replace the master boot module with an uninfected copy of the master boot module responsive to the master boot module being infected with malware.

* * * * *